Figure 1:
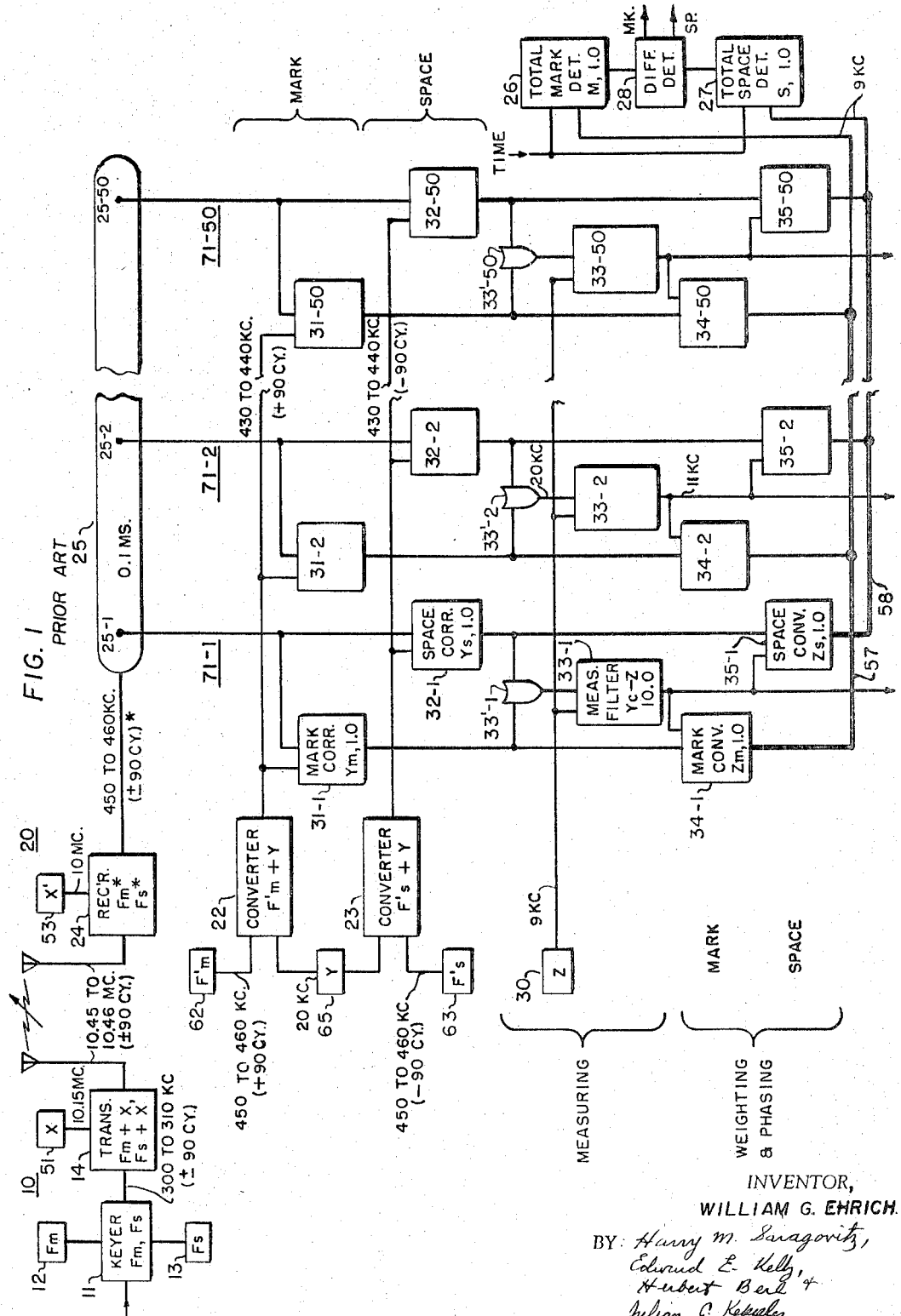

Dec. 20, 1966 W. G. EHRICH 3,293,551
COMMON CHANNEL MULTIPATH RECEIVER
Filed Dec. 24, 1963 3 Sheets-Sheet 1

INVENTOR,
WILLIAM G. EHRICH.
BY: Harry M. Saragovitz,
Edward E. Kelly,
Hubert Berl &
Julian C. Keppler ATTORNEY Dec. 20, 1966 W. G. EHRICH 3,293,551
COMMON CHANNEL MULTIPATH RECEIVER
Filed Dec. 24, 1963 3 Sheets-Sheet 2
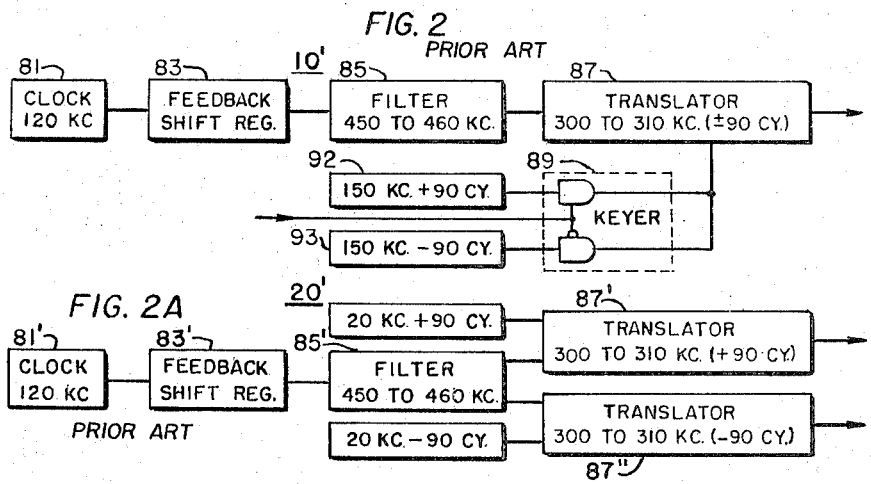
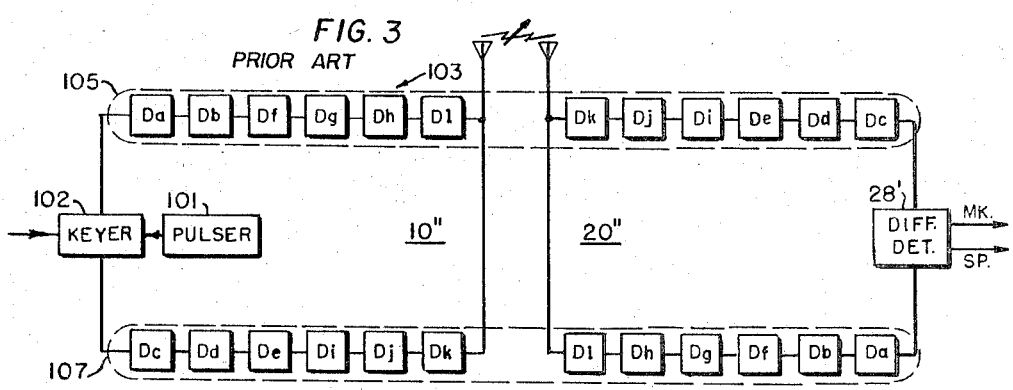
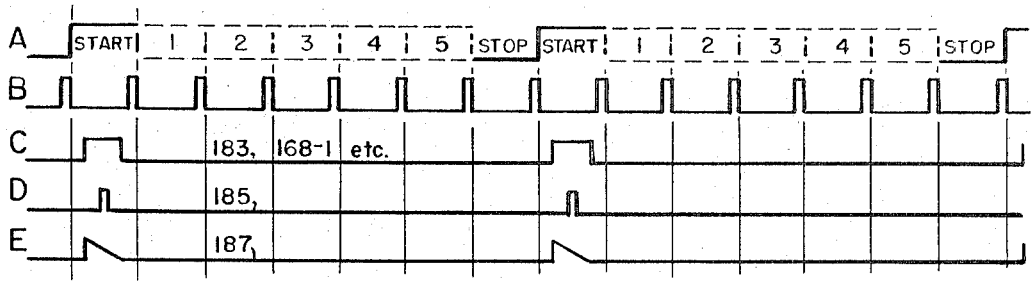
FIG. 5
INVENTOR,
WILLIAM G. EHRICH.
BY: *Harry M. Saragovitz,*
*Edward J. Kelly,*
*Herbert Berl* &
*Julian C. Keppler*
ATTORNEY.

Dec. 20, 1966 W. G. EHRICH 3,293,551
COMMON CHANNEL MULTIPATH RECEIVER
Filed Dec. 24, 1963 3 Sheets-Sheet 3

INVENTOR.
WILLIAM G. EHRICH,
BY Harry M. Saragovitz,
Edward J. Kelly,
Herbert Berl &
Julian C. Keppler
ATTORNEY:

3,293,551
COMMON CHANNEL MULTIPATH RECEIVER
William G. Ehrich, Media, Pa., assignor to the United
States of America as represented by the Secretary of
the Army
Filed Dec. 24, 1963, Ser. No. 333,237
2 Claims. (Cl. 325—320)

This invention relates to the solution to multipath problems in communication, and particularly to an improvement on the so-called "Rake" system discussed at length in Proceedings of the IRE, vol. 46, No. 3, March 1958, pp. 555–570, "A Communication Technique for Multipath Channels," by R. Price and P. E. Green, Jr., and also described and claimed in Price and Green Patent No. 2,982,853. Such a system involves frequency translations, correlation of wideband complex waves and other manipulations in a large number of similar circuits, and it is often desirable to provide a presentation of the rapidly varying multipath properties of the communication channel. It has been found that the number of operations and the necessary components therefor can be substantially reduced to simplify the basic operation and at the same time minimize the need for adjustment of even the reduced number of components, and even provide a particularly convenient system in which to apply an indicator to show multipath characteristics. The particular details can best be analyzed in relation to the description and drawing to follow.

The disclosure of the present application provides:

(1) Background material, presented in a manner to most conveniently introduce and therefore shorten the description of the present invention, including a description and drawings relating to the multipath techniques of Price and Green and some aspects of a rather different multipath technique described in the June 1960, IRE Transactions on Information Theory, pages 367–373, "A Matched Filter Communication System for Multipath Channels" by Steven M. Sussman, one of the inventors in patent application Serial No. 158,148, filed June 23, 1961;

(2) A description and drawing relating to simplification of the Price and Green multipath technique, the actual subject matter of the present application; and (3) A description of further matter on the same drawing covering the simplified multipath technique, in which such simplified technique permits a particularly convenient approach to the continuous observation of the multipath characteristics, the actual subject matter of another joint application of the present inventor and his co-inventor David Sunstein, filed concurrently herewith, Dec. 24, 1963, Ser. No. 333,236.

In the field of wideband or complex functions the terminology frequently involves orthogonality, correlation, and matched filters. These terms are not necessarily restricted to such complex functions. For example, the term "orthogonal" has been commonly used in identifying the mutually perpendicular coordinates of a two-dimensional surface or three-dimensional space. Since phase relations are commonly portrayed on a two-dimensional surface it is quite natural that the term should be applied in designating phase quadrature, and since frequency is often recognized as another dimension the term applies equally well to differences in frequency. Thus sine and cosine waveforms at a particular frequency may be considered orthogonal. When multiplied together the instantaneous product may be either positive or negative but over a period of time will have an average value of zero, a condition referred to as orthogonality. On the other hand, similar waveforms in phase coincidence or phase opposition (both sine or both cosine waves) are considered non-orthogonal since the average value of the product may be predominantly positive or predominantly negative. In either case there is a double frequency component, not usually of interest.

It may be observed that waveforms of two different frequencies also are orthogonal in the sense that the product will involve values both positive and negative with neither one predominant. However, the variations in these values follow a very regular pattern corresponding to the difference frequency and sum frequency, both of which are very commonly used. In the case of highly complex functions the orthogonality may be considered sometimes as absolute in the sense that no simple characteristic of the product term can be recognized. However, in many cases the orthogonality is limited, indicating merely that the product terms include no components to which the output circuits are actually responsive. Many aspects of these terms will be brought out in connection with the following description of the invention and the prior art background.

The actual multiplication of the voltage functions is commonly referred to as correlation and may apply to very simple waves but is commonly used regarding complex waves. The correlation process involving multiplication of voltages is ordinarily accomplished in a modulator type of circuit. In the case of very wide band signals where the actual output may be within the same band as the inputs the modulator would be of the fully balanced type, such that all inputs are balanced out and only the sidebands or product terms actually reach the output. Otherwise any filtering in output to exclude input would also exclude desired product terms. It will be apparent that if all frequency components of the 2 inputs are in like phase (or even opposite phase) the product terms for all frequencies will be of the same polarity and therefore produce a strong correlated output. On the other hand, if some components are in like phase and others in opposite phase the product terms will be of opposite polarity and therefore produce no overall output. Any frequency components which are in phase quadrature will produce no overall output in any case.

The process of multiplication involves the use of active circuitry but much the same results can be obtained in passive circuitry. For example, as indicated below a single sharp pulse is recognized as representing many frequencies; if various frequency components are delayed by different amounts the resultant is commonly recognized as a complex function of these many frequencies. If the receiver can delay these various frequency components by complementary amounts they will again coincide in time and reform the original pulse. This is one of the recognized forms of matched filter. This term, however, is not necessarily restricted to entirely passive devices or even to very complex functions. For example, in frequency shift keying Teletype the mark and space filters for the respective signals are of course tuned to the corresponding frequencies but in addition these filters may be short-circuited at the end of each signal interval or baud as shown in Wozencraft Patent No. 2,880,316 so that they may integrate the new signal only over its proper interval. In this case the term "matched filter" indicates that the circuit is tuned to the proper carrier frequency and also controlled to respond only over the actual signal interval. The term "matched filter" is sometimes applied to circuits for such relatively simple waveforms.

In order to avoid abstractness of mere symbols to represent particular frequencies, and still avoid the distraction involved in arithmetical operations, illustrative numerical values of the frequencies etc. are given in round numbers approximating those actually used, or in some cases best suited for comparison of different operations.

These values are in no sense limiting. In fact, the illustrative values used in the description and drawings for purpose of comparison were not those actually used in the apparatus of the invention. The actual values are also given in the text but would tend to confuse the relation of the invention to the prior art system.

The object of this invention is to simplify the equipment and operation involved in multipath correction receiver systems, particularly in regard to the display of information as to the prevailing multipath pattern from time to time. Further objects and advantages will become apparent from the following detailed description of the invention.

The subject matter of the invention will best be understood by reference to the drawings, which first include matters relating to the prior art and then the actual invention. In the drawings—

Figure 4:
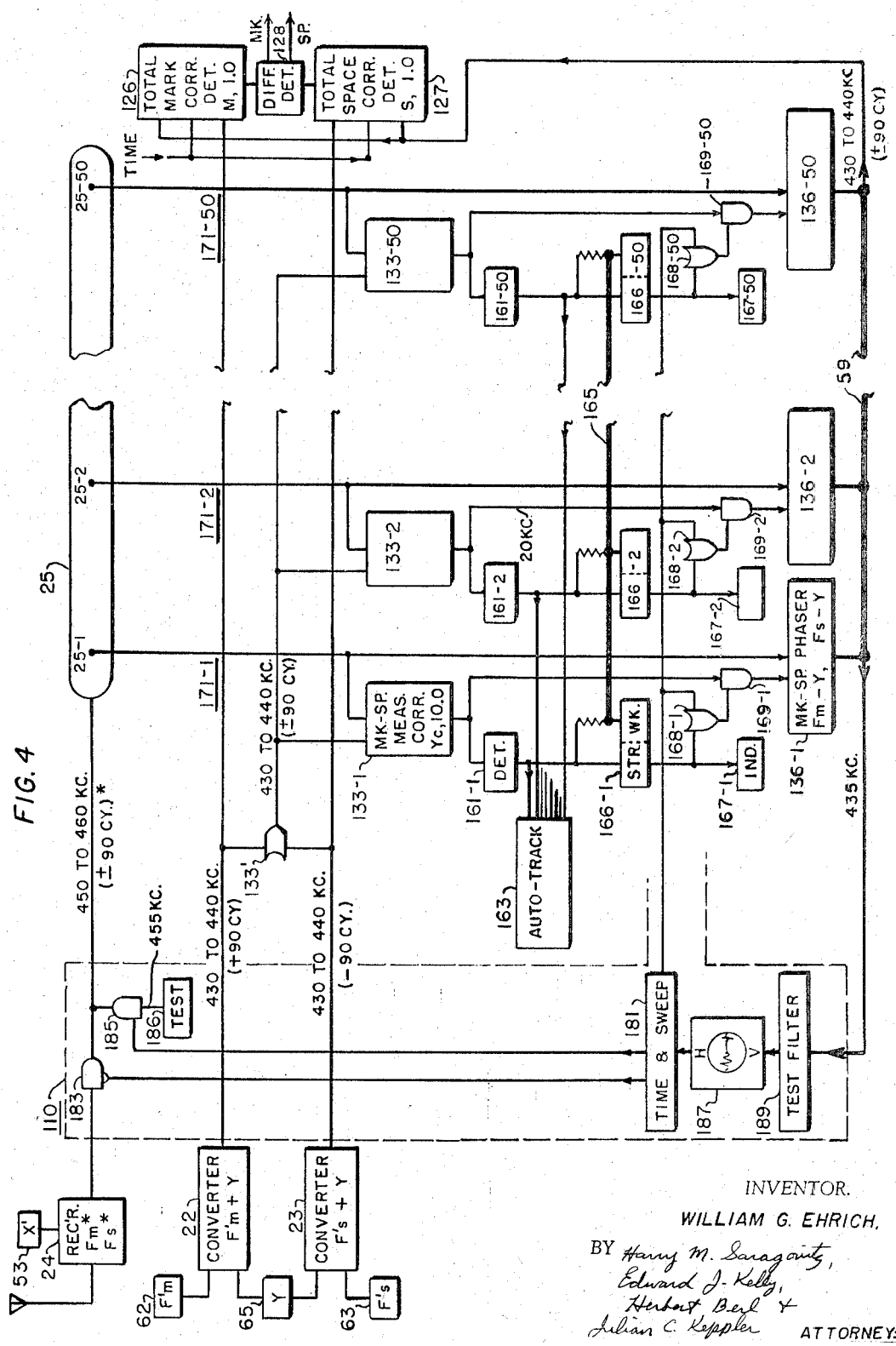

FIG. 1 corresponds to the original Rake equipment mentioned above but has been rearranged to clarify the operation particularly for purpose of comparison to the improvements involved in the present application;

FIGS. 2 and 2A provide details of typical function generators as used in such Rake equipment;

FIG. 3 corresponds to the function generator of the type used in the illustrative multipath system described by Sussman;

FIG. 4 shows the receiving portion of the modified Rake equipment and multipath pattern display in accordance with the present invention; and FIG. 5 illustrates some timing waveforms, particularly as related to the display.

In FIG. 1 many of the reference numerals have been copied from the patent on this equipment, altho certain additional elements considered helpful for comparison to the present invention have been added. The transmitter portion 10 involves a source 12 for the complex mark function $Fm$ and a source 13 for the corresponding space function $Fs$ connected thru a keyer 11 controlled in accordance with the information input. Therefore, one or the other of the signals $Fm$ and $Fs$ will be supplied to the transmitter 14. A source 51 of the carrier current designated as X is also supplied to the transmitter, which is assumed to be of the single sideband type and therefore provides a signal of frequency assumed to correspond to the sum of the sources $Fm$ or $Fs$ with the carrier frequency X. This signal is propagated thru the atmosphere or other medium subject to various reflections causing multipath effects.

The receiver portion 20 comprising the major part of FIG. 1 involves a corresponding single sideband receiver 24 and source 53 of frequency $X'$ similar to the carrier X and therefore produces mark or space functions $Fm^*$ and $Fs^*$, similar to $Fm$ and $Fs$ except that they are modified by the multipath effect and may not necessarily have the same frequency band as the original signals. The receiver output is supplied to a delay line 25 assumed to include 50 taps designated as 25–1, 25–2 . . . 25–50. The delay between taps is illustrated as 0.1 millisecond (MS).

The output circuits from these various taps are designated as tap circuits 71–1, 71–2 . . . 71–50 and are all adjusted to have identical characteristics as further discussed below. These tap circuits require reference mark and space signals substantially corresponding to the mark and space signals of the transmitter. The sources of mark and space reference signals in the receiver are designated as producing functions $F'm$ and $F's$, assumed to correspond to the functions $Fm^*$ and $Fs^*$ as received but without the multipath effects. A source 65 of energy at a frequency designated Y is combined with each of the complex functions to convert to range designated $F'm-Y$ and $F's-Y$, which are to be used in the actual correlation process. The particular frequency Y is selected to provide a convenient output frequency when the received signals are correlated to the reference signals.

In the first tap circuit 71–1 there is a mark correlator 31–1 and a space correlator 32–1. When the delay on thit first tap of the delay line 25 is correct so that a particular multipath component corresponds in time to the output of the converters 22 or 23 correlation will be actually accomplished at the corresponding correlator 31–1 or 32–1. The outputs of these two correlators are used for two different yet related purposes. The first purpose is to determine whether the particular tap circuit is actually providing a sustained correlated output over a succession of mark or space signals or bauds, the magnitude of such output, and even its phase. The second purpose is to determine which of the mark or space signals actually produces the correlated output in each baud. The sustained phase as determined above is then used to convert the output of the mark or space correlators to a common reference phase in each tap circuit, so that the outputs of the several tap circuits can be combined. The correlation ampltiude simultaneously serves to weight the outputs of the several tap circuits in accordance with the prevailing amplitude of correlation on the particular tap circuit over a significant period of time thus tending to exclude random noise in those tap circuits which have not been providing a significant part of the combined signal.

In the mark and space correlators the time constant must be such that the signal can build up an output during each baud of the message when correlation is accomplished, but to avoid interference from noise should not be substantially shorter than one baud; thus these correlators are designated as providing signals $Ym$ and $Ys$ of frequency corresponding to the source 65 and of a time constant in the order of 1.0 baud. The polarity of sources for $Fm$, $Fs$, $F'm$, $F's$, and Y, and any phase shift in the correlators, are carefully maintained to provide like phase in the outputs, whether mark or space signals are transmitted. Thus correlator outputs are coherent in phase over successive bauds and are combined in a buffer or OR gate 33'–1 and supplied to a measuring filter 33–1 which is of very narrow bandwidth. The filter also includes means for frequency conversion by combining with further energy at a frequency designated Z from a source 30; thus the combined mark and space correlated signals are designated as $Yc-Z$. In this case the time constant must be considerably longer to show the cumulative trend of the multipath signals over a considerable number of bauds, assumed to be in the order of 10 bauds and so designated in the figure. It will be recognized that the time delay provided by the line 25 provides for major variations in delay due to the multipath effects to determine which of the many tap circuits contains signals which are properly correlated, but minor variations in phase affect the phase of the correlated outputs and over a significant period will also affect the phase of the output of the measuring filter. The output of this measuring filter is then recombined with the outputs of the mark and space correlators in further mark and space converter circuits 34–1 and 35–1 and supplied to mark and space busses common to all the tap circuits. Since the converters receive the correlation outputs both directly and thru the measuring filter, and receive the energy at frequency Z thru the filter, the actual output frequency and phase is determined by Z. Again the system phase relations are carefully maintained to assure that the various tap circuits provide like phase $Zm$ and $Zs$ to each of the busses. However, both of these converters must have a time constant, designated as 1.0, suitable to accept the successive signal bauds of the message. The other tap circuits are of identical construction and the only critical requirement is that the phase adjustment must be proper so that the signal components of the several tap circuits will be in proper phase to combine on the mark and space busses which provide the ultimate output. The outputs of these mark and space busses are supplied to total mark detector 26 and total mark detector 27. These detectors also include a timing input as in the Wozencraft patent, so that the signals will be read near the end of the signal baud. The outputs of the detectors 26 and 27 are compared in difference detector 28 which provides a mark or space output depending on the stronger of the correlated outputs of the several tap circuits as combined on the mark or space busses.

FIG. 1 has illustrated sources of mark and space functions somewhat separately for simplicity in analysis of the system. Actually they might be rather closely related for simplicity and economy of the equipment. FIG. 2 shows a typical detail arrangement of a binary system of reproducible function generation as proposed by Price and Green in the publication. This involves a 120 kc. clock 81 driving a feedback shift register 83 to provide a quasi-random train of pulses. Any "information" content of such a train, not here of actual interest, could be transmitted at frequencies from 0 to 60 kc. However, the squared waveform contains much higher frequency components, some of which are here selected as the function by the IF filter 85 from 450 to 460 kc. This range is typical of ordinary broadcasting and is considered wideband since it is many times the almost inaudibly low bandwidth range required for ordinary teletype, such as 25 cycles for the maximum frequency component of 50 baud per second teletype, the approximate information rate here considered. In television the picture bandwidth range of a few megacycles is equally many times the range here considered wideband.

A translator 87 is used to convert this signal to a different range, under control of a keyer 89 depending on whether a mark or space signal is to be transmitted. In either case a frequency substantially 150 kc. is subtracted so that the range is now 300 to 310 kc. However, for mark this signal is illustrated as 150 kc. plus 90 cy. and for space 150 kc. minus 90 cy. Returning to FIG. 1 the transmitter 14 is illustrated as converting to a range of 10.45 to 10.46 mc. with the variation ($\pm 90$ cy.) to be discussed below, and the receiver 24 as converting back to the common IF range of 450 to 460 kc.

The function generator of the receiver portion 20' as detailed in 2A includes similar clock 81', register 83', and filter 85' the same as in transmitter portion 10'. However, in the transmitter portion 10' the keyer could select either a mark or space function for a single translator according to the predetermined mark or space input, whereas in the receiver portion 20' both functions must be available in two translators 87' and 87'' to identify either of the as yet undetermined mark or space functions. In this case the sources 92' and 93' are indicated as 20 kc.$\pm 90$ cy. Thus when the signals are correlated the mark pairs and space pairs will both provide 20 kc. outputs, to which the output circuits are responsive. However, the mixed mark and space pairs will provide 20 kc.+180 cy. or 20 kc.—180 cy. and may be considered orthogonal as far as the output circuits are concerned. The correlator time constant (inversely proportional to its bandwidth) should be comparable to the length of signals to be correlated, thus allowing optimum sensitivity and selectivity, determined by its filter bandwidth—*not* by the far greater IF and function bandwidth—and allowing closely spaced translating frequencies to be used, even tho the functions occupy substantially the same bandwidth.

The energy involved is spread over a wide band yet does not fully occupy this band. This situation may be very crudely illustrated by a system wherein one may communicate on 60 adjacent channels 1 second at a time in succession then repeat, using a properly synchronized receiver. Such a system involves a 60-channel bandwidth over each minute but does not fully occupy all channels, does not admit noise except in one channel at a time, etc. The more sophisticated wideband technique increases complexity but reduces such difficulties as fading, somewhat in the manner of frequency diversity systems. It must be emphasized that a translation of such a complex wave by adding a small chosen frequency applies to each and every frequency component, and changes in the band limits are only of incidental significance. This translation establishes the output at such chosen frequency when original and translated signals are correlated; if there were no translation correlation output would be D.C. The correlation filters may readily separate D.C. or rather small frequency differences. On the other hand, mere miror differences in the band limits or phase characteristics of the filters reduce only the correlation efficiency and output. Thus very small variations in the chosen frequency are significant, but rather large variations in the band limits can be tolerated. The illustrative frequencies shown on the drawing include both the non-critical band limits of the complex functions expressed in kilocycles (kc.) and the relatively critical differences in translation frequencies for mark and space expressed in cycles (cy.).

FIG. 3 illustrates the mode of generating mark and space functions by pulse excitation of a delay system of highly non-linear phase-frequency characteristics at the transmitter, and complementary non-linear delays at the receiver, the combined delays being highly linear. In the transmitter portion 10'' a pulser 101 is controlled by a keyer 102 to excite a series delay circuit 103 of unlike elements D$a$, D$b$, D$f$, D$g$, D$h$, D$l$, by a mark, or circuit 104 of elements D$c$, D$d$, D$i$, D$j$, D$k$ by a space. In the receiver portion 20'' the complementary elements D$c$, D$d$, D$e$, D$i$, D$j$, D$k$ reform a mark pulse and D$a$, D$b$, D$f$, D$g$, D$h$, D$l$ reform a space pulse. Thus the entire set of elements in both transmitter and receiver act as linear delay devices 105 and 107, as inclosed by dotted lines in the drawing. The difference detector 28' determines whether the mark or space pulse signal is dominant. For correlation by active multipliers the receiver delay elements also may be pulse energized; in this case the like sets of elements rather than complementary sets will correspond to the same mark or space function. The mark and space waveforms generated by such delay systems would not be orthogonal in a general sense, not because of an output circuit responsive to some particular correlation output frequency.

In several cases the system components provide more than one significant function. The legends have been selected to emphasize the most critical function in the normal system operation, but other functions also are discussed in the text.

Various symbols provided by U.S. Army Military Standard 806B, Feb. 26, 1962, "Graphic Symbols for Logic Diagrams," have been used in the drawings, sometimes even for analog rather than digital circuits. In the case of a binary or two-state circuit a dotted divider line emphasizes the two "sides" of the circuit, whether bistable, quasistable, or in a Schmitt trigger mode of operation.

With the foregoing detailed background the actual invention in FIG. 4 can be explained rather briefly. The multipath indicator system 110 inclosed by a dotted line will be discussed later. The reference signal sources 62 and 63 may be considered equivalent to those in FIGS. 1 2, or 3. Actually they are unlike any of those, but the details are immaterial to an understanding of the inventive subject matter. The receiver 24 and delay line 25 are unchanged. However, in this case the mark and space reference signals are combined in an adder shown as an OR gate 133', then in each tap circuit further combined in correlator 133–1 etc. with both the mark and space outputs of the delay line taps. This correlator provides the same long time constant filter action as in filter 33–1 of FIG. 1 to measure the amplitude and phase, but since separation of mark and space signals is not required at this point one correlator has been eliminated in each tap circuit.

The measured amplitude and phase in the output of correlator 133–1 is combined in the mark space phaser 136–1 with both wideband signals directly from the delay line tap so that the combined wideband mark and space signals from all taps are properly weighted and in the same phase to be combined on a single bus 59. The basis for such weighting is set forth on page 557 of the Price et al. publication and bibliography item (19), the Brennan article. In this case the wideband mark and space signals of the several taps combined on such single bus are correlated with the reference signals from sources 62 and 63, requiring only two mark and space correlation detectors 126 and 127, and the translations are such that the correlations result directly in D.C. outputs. A difference detector 128 identifies the dominant mark or space output.

Before considering certain control circuits and functions it will be helpful to compare the required quantity of the most significant components for the two types of systems with equivalent resolution, for example:

| Component | Quantity (and Ref. Numeral) | |
| --- | --- | --- |
| | Fig. 1 (Price) | Fig. 4 (Ehrich) |
| Wideband correlators connected to delay line | 100 (31, 32) | 50 (133) |
| Narrow filters | 50 (33) | 50 (133) |
| Phasers, narrow band | 100 (34, 35) | |
| Phasers, wide band | | 50 (136) |
| Detectors, narrow band | 2 (26, 27) | |
| Detectors, wide band | | 2 (126, 127) |

It will be noted that the components are not necessarily represented by separate blocks of the diagram, and that the legends are not necessarily the same in both diagrams. The saving in number of components also leads to even greater savings in time for adjustment and consequent down-time of the equipment.

The output of measuring correlator 133–1 is also rectified in detector 161–1 and used for several purposes. Some of these purposes are involved in the prior Rake system of FIG. 1 but were not shown or described above. The outputs of detector 161–1 etc. of all tap circuits are supplied to Auto-track unit 163, which is used to correct timing so that effective taps will be centered on the delay line. The outputs are also averaged on bus 165 and in each tap circuit the average is compared to the individual output on a binary circuit 166–1 etc. such as a Schmitt trigger, which provides a control signal when the individual output is stronger than average, but not when weaker. This signal controls an indicator 167–1 to show the tap circuit is effective and also thru OR gate 168–1 enables AND gate 169–1 to permit operation of the phaser 136–1. When the sustained correlation and output of detector 161–1 etc. in a particular tap circuit are higher than average phaser 136–1 is effective; otherwise it is disabled at gate 169–1 to eliminate random noise, a simplification of the weighting concept referred to previously regarding operation of phaser 136–1. The OR gates 168–1 etc., altho not fully inclosed by the dotted line 110, relate to the test display of the prevailing multipath pattern discussed below.

In the previous description no details of the timing were mentioned. However, in connection with the multipath indicator ordinary teletype timing with signal bauds and start-stop synchronizing bauds is assumed. Part of the time normally used for synchronizing may be borrowed for operation of the indicator since no information will be lost. FIG. 5 shows a few waves illustrative of the timing, for example:

Line A represents a typical teletype wave with two synch bauds and five information bauds per character.

Line B represents a typical timing wave for the detectors 126 and 127 to read the correlated signal outputs at the end of each baud.

Lines C, D, and E represent typical timing waves required for operation of the indicator system and provided by time and sweep circuit 181 of FIG. 4 to the other components identified by reference numerals on the waves.

Waveform C controls gate 183 in the receiver circuit to eliminate the received signal from the delay line during part of the synchronizing interval and controls gates 168–1 and 169–1 in case the prevailing tap circuit signal had not been strong enough to actuate binary circuit 166–1. Waveform D controls gate 185 to apply from source 186 a brief test signal for an interval of roughly 0.1 ms., the same as the interval between taps of a delay line so that pulses from the various taps will substantially occupy the intervals without excessive overlap. Waveform E provides a sweep voltage for oscilloscope 187. As the test signal reaches the various delay line taps it combines with the measured outputs of correlators 133–1 etc. in phasers 136–1 etc. to provide a signal passed by filter 189 to the oscilloscope. For this test signal the same aspect of the operation of phaser 136–1 has no importance but the weighting aspect is essential. This signal through filter 189 is presented on the oscilloscope to indicate the relative amplitudes of the many prevailing multipath signals.

This indicator operation has been provided with only minor added circuitry to that required for the already simplified multipath correction system, using the same delay line to apply the test signal successively to the indicator and the same phasers and their sources of stored measured weighting (and phasing) voltages for the successive indicator inputs.

The illustrative frequencies have been carried forward from FIG. 1. However, a test source has been added and one source used in the original "Rake" has been eliminated. In the actual system the delay line was operated at approximately 430 to 440 kc., the reference signals and the common mark space bus at 380 to 390 kc., and the measuring correlator at the difference of 50 kc. Selection of operating frequencies is generally non-critical; however, some judgment may be helpful in reducing effects of undesired harmonics within the range of the filters. The time constant of the measuring correlator filter may be variable according to the prevailing rates of change in multipath conditions, frequently about 25 bauds for a teletype signal interval of about 22 ms. Since the total delay on the fifty taps of the line is shown as 5.0 ms. the indicator operation would require only about one-fourth of one of the two synchronizing baud intervals.

The waveforms of FIG. 5 are merely illustrative and not intended as limiting or drawn to scale, for example:

The test is illustrated in the start period of the Teletype wave but in fact was operated in the stop period; and For the values assumed the sweep period is illustrated longer than actually required while the test pulse is illustrated longer than would be suitable to avoid excessive overlap of pulses on the indicator.

The Price publication also includes a delayed reference species which requires double delay lines, one for each of mark and space reference functions, but does involve part of the saving in correlators as in the present improvement. It combines the prevailing multipath weight and phase effects into these reference signals before a single correlation for each of mark and space signals, rather than correlating in each tap circuit before weighting. The reason for maximum economy in the present improvement is that the multipath correction is provided on one path of each tap circuit used for both the alternative mark and space signals, avoiding duplication for actual or reference signals used effectively only half the time.

The particular values are only illustrative and could be varied widely without altering the overall mode of operation. Many variations in the system would also be apparent to those skilled in the art.

What is claimed is:

1. In a receiver for a wideband correlation communication system for transmitting digital information identified by selectively transmitted plural functions thru a communication channel subject to propagation of multipath signals delayed in several amounts according to a delay pattern which is repeated in similar form for successive digital signal periods, having a tapped delay line for said signals with outputs connected to various tap circuits, and a source of corresponding plural receiver functions for correlation with said signals, the combination with said delay line and source, of means to combine said plural receiver functions, means in each tap circuit to correlate the received signal with said combined functions to produce a measuring output of sustained amplitude and phase corresponding to the prevailing long term correlation in said tap circuit as determined by prevailing path delays, means to recombine the delay line tap output with said measuring output to provide output signals from each tap circuit of weighted amplitude and phase determined by the measuring output, such that all tap circuit outputs are in a common phase relation to be combined on a common bus, and means to correlate the combined output on said bus with the separate plural functions to determine which of such plural functions had been transmitted, whereby the several multipath components contribute to an output of maximum signal to noise ratio.

2. In a receiver as in claim 1, further means responsive to a lesser measuring output amplitude of each tap circuit than the average measuring output amplitude of all tap circuits to prevent the measuring output of said tap circuit from recombining with the delay line tap output, thereby excluding noise produced by those tap circuits whose output signal contributions would be less than average.

References Cited by the Examiner
UNITED STATES PATENTS 3,168,699　2/1965　Sunstein et al. _____ 325—65 X

OTHER REFERENCES

Price et al.: Proc. I.R.E., vol. 46, No. 3, March 1958, pp. 555–570.

DAVID G. REDINBAUGH, *Primary Examiner.*

JOHN W. CALDWELL, *Examiner.*